May 28, 1946.　　L. P. PARADISE ET AL　　2,401,096
REGULATOR CIRCUIT
Filed Sept. 18, 1943　　3 Sheets-Sheet 1
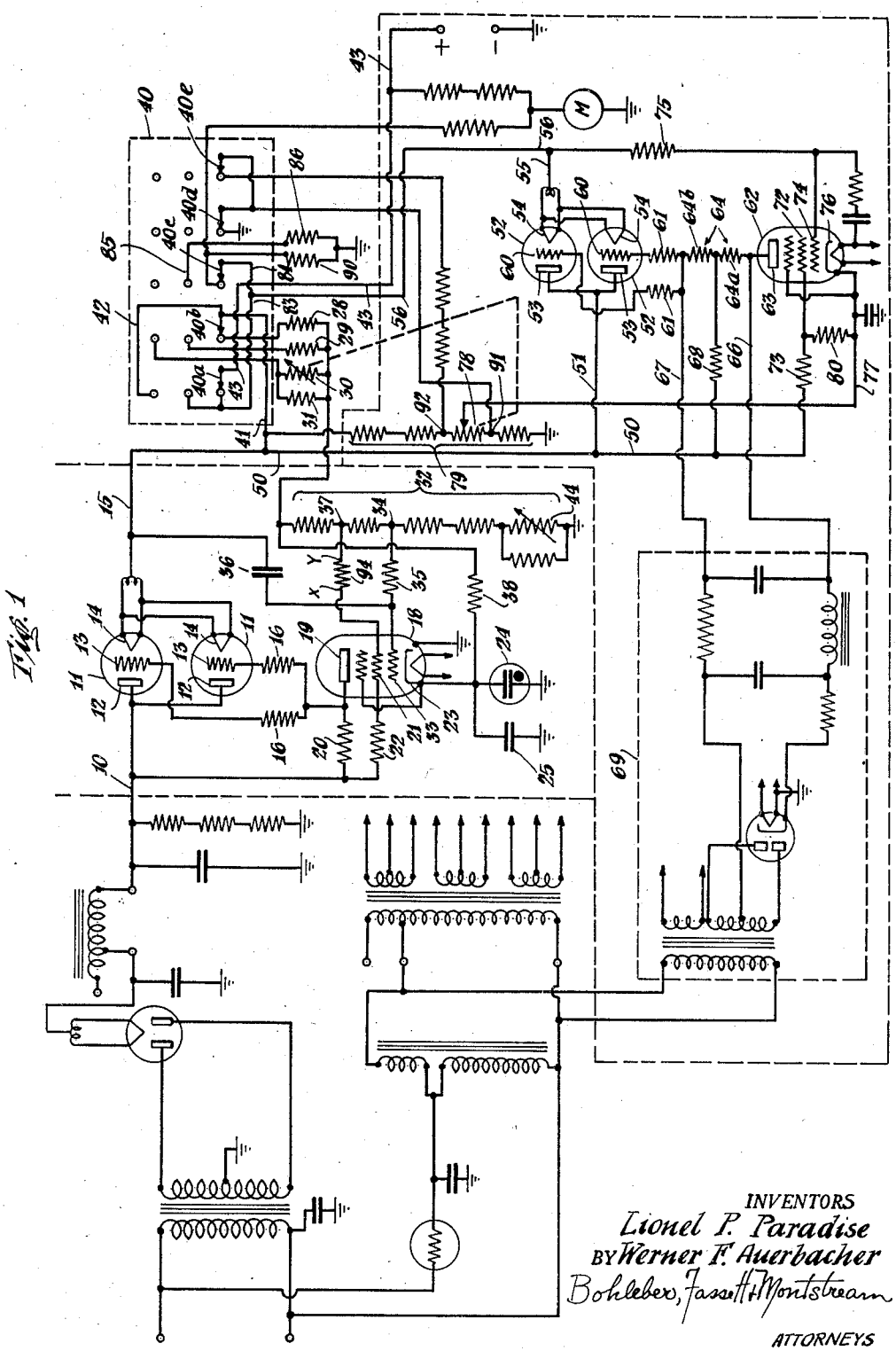
INVENTORS
*Lionel P. Paradise*
BY *Werner F. Auerbacher*
*Bohleber, Fassett Montstream*
ATTORNEYS

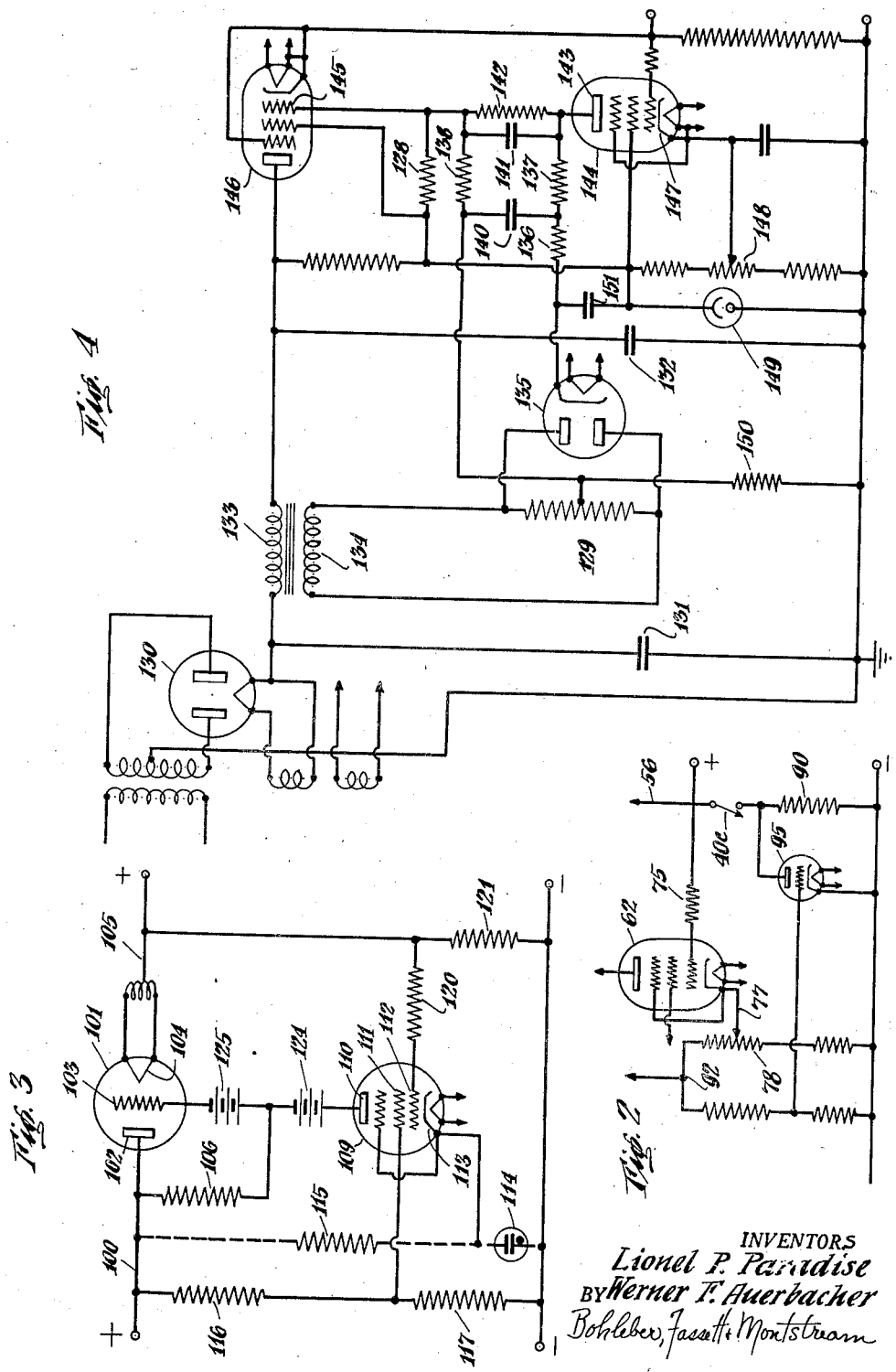

May 28, 1946.　　L. P. PARADISE ET AL　　2,401,096
REGULATOR CIRCUIT
Filed Sept. 18, 1943　　3 Sheets-Sheet 3
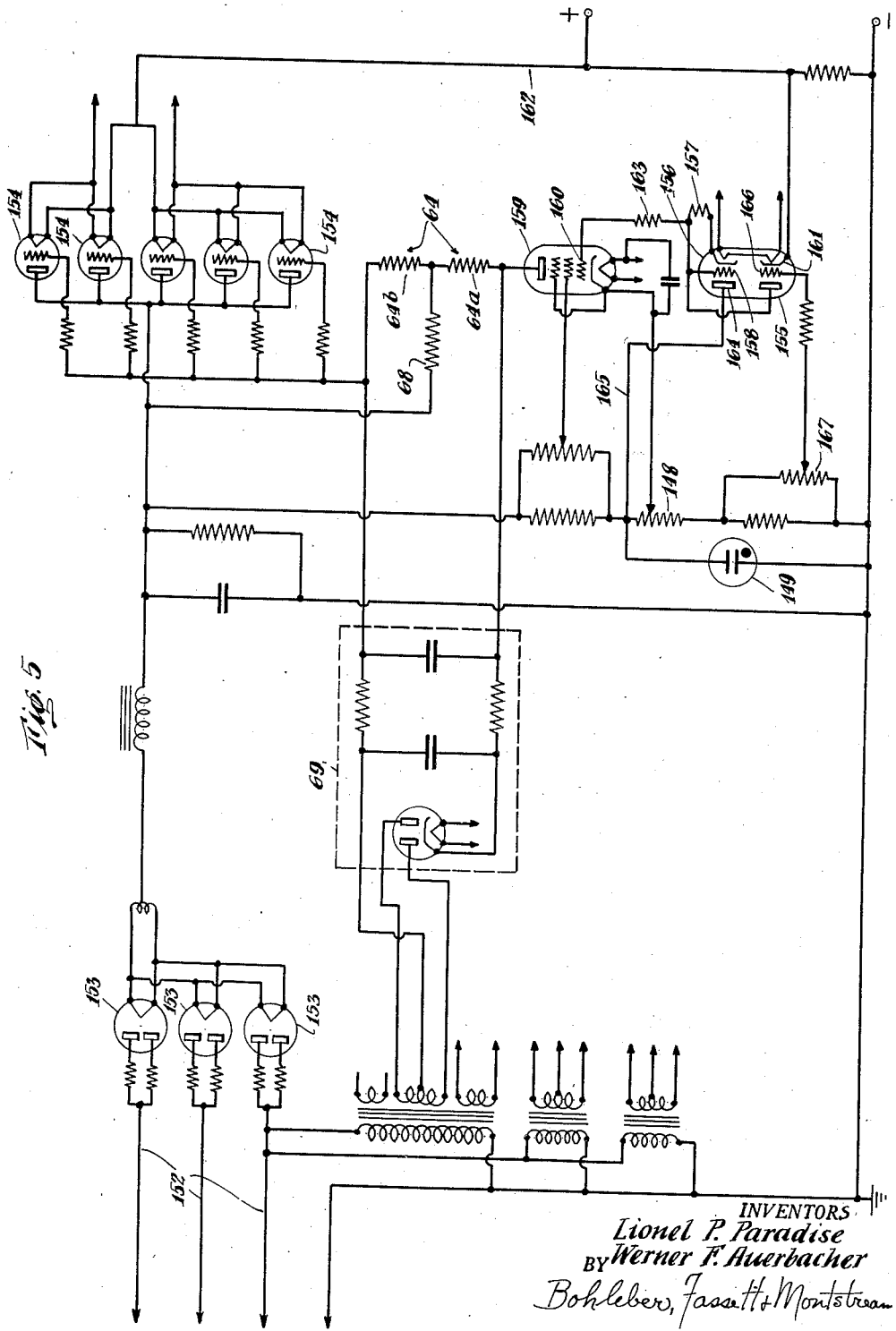
INVENTORS
Lionel P. Paradise
Werner F. Auerbacher
BY
Bohleber, Fassett & Montstream
ATTORNEYS Patented May 28, 1946

2,401,096

UNITED STATES PATENT OFFICE 2,401,096

REGULATOR CIRCUIT

Lionel P. Paradise, New York, and Werner F. Auerbacher, Brooklyn, N. Y., assignors to Radio-Television Institute, Inc., New York, N. Y., a corporation of New York Application September 18, 1943, Serial No. 502,926

34 Claims. (Cl. 171—229)

The invention relates to a circuit or device for providing a regulated direct current power supply by which the voltage applied to a load is regulated and remains substantially constant irrespective of whether there is variation in the load current or a variation in the input line voltage. The circuit or device provides means by which the output voltage can be varied or selected at will in a range from zero volts up to several hundred, the maximum being 300 volts at least for the double unit particularly illustrated and with the electronic devices illustrated and referred to herein. By the selection of other known electronic devices having higher voltage characteristics and selecting the other parts involved in the circuit to conform to the higher voltages sought, the device will enable a considerably higher voltage range to be attainable. The invention also relates to a single unit voltage regulator which regulates selected voltages in a range from zero volts up to 200 volts at least with the electronic devices illustrated.

It is an object of the invention to construct a circuit the output voltage of which may be varied or selected over a considerable range from zero volts upward and in which the output voltage remains constant or at most varies slightly or immaterially irrespective of any variation in the load current or variation in the input line voltage within the rating of the device.

Another object of the invention is to provide two regulatory circuits in cascade whereby extremely accurate regulation of the output voltage is attained from zero up to several hundred volts irrespective of reasonable variations in line or input voltage in which the first stage provides the upper or higher voltage range and the two units in cascade provide the lower range of voltage variation.

Another object is to construct a regulator circuit which can be connected in cascade with another regulator circuit to give regulated voltage output in a lower range of potentials down to zero voltage and with no or immaterial variation in the voltage irrespective of variation in the load current or reasonable variation in the line voltage.

A still further object is to construct new and novel circuits which maintain the output voltage constant or substantially so over a wide range of voltages irrespective of any variation in the load current or reasonable variation in the input voltage.

A still further object is to construct a circuit for regulating the voltage in the output thereof irrespective of changes in the load current or reasonable changes in the input voltage and having a wide range of voltage variation available down to zero volts including one or more regulation tubes and a control tube therefor having an independent source of direct current voltage applied to the plate and an independent source of negative bias applied to the control grid or grids of the regulator tube or tubes.

Another object is to construct a circuit utilizing a regulator means and a control tube for regulating the voltage in a supply line in which selection of the voltage in the output line is controlled by varying the impedance connection with ground of the control tube.

A further object is to construct a circuit for regulating the voltage of a supply line irrespective of variation in load current or reasonable variation of input voltage with a range extending from an output potential of approximately zero volts.

A still further object is to make a circuit for regulating the voltage of a supply line with a range extending to or approximately to zero volts in the output.

Another object is to provide a voltage regulator circuit having a regulator means and a control tube therefor in which the latter obtains a separate source of D. C. potential which is rectified and filtered from a transformer used in lieu of a choke in the main filter.

Other objects of the invention will be more apparent from the following description taken in connection with the accompanying drawings illustrating preferred embodiments of the invention in which Figure 1 is a diagrammatic view of a complete circuit having two regulator units connected in cascade.

Figure 2 is a diagrammatic view of a bleeder tube which may be used in the circuits shown.

Figure 3 is a diagrammatic view of a voltage regulator circuit capable of delivering a voltage in the output line from zero volts up to two or more hundred volts which may be used as a separate unit or may with slight modification be connected as a second unit in cascade with another or primary regulator unit.

Figure 4 is a diagrammatic view of a regulator circuit utilizing a transformer in lieu of a filter choke as a source of secondary D. C. potential when used in conjunction with a rectifier and filter.

Figure 5 is a diagrammatic view of a regulator circuit having means for compensating for variations in heater potential in the control tube.

The voltage regulator illustrated in Figure 1 utilizes two units to obtain a range of regulated voltages from 0 volts to 300 volts or more. The first unit has a range of approximately 200–300 volts and the second unit connected in cascade with the first unit provides a range from 0 volts to 200 volts or more. There may be an overlap in the ranges.

The circuit is shown connected with a source of D. C. supply which may be obtained by any suitable circuit or mechanism, although a transformer, a full wave rectifier and filter means is shown to convert 115 volt 60 cycle A. C. supply into direct current having a voltage of approximately 500 volts for a voltage regulating circuit having a voltage range from zero to 300 volts as the desired range in the output.

The regulator circuit is connected with the D. C. supply and includes a variable resistance means which may include one or more electronic discharge devices or regulator tubes connected in parallel. The number of regulator tubes utilized depends upon the current which is to be delivered through the circuit to the output or load. The electronic discharge means includes one or more tubes which may be triodes 11 having a plate 12, control grid 13 and cathode 14. The output line 15 from the first unit carries the current to the load at the selected and regulated voltage. It will be observed therefore that the load or supply line or that portion thereof for the first unit includes the input line connection 10, the tubes 11 and the output line 15.

The regulator tubes 11 have their grids connected through a suitable impedance 20 to the load line and preferably to the input line 10 or the plate 12 of the regulator tube 11. In addition each control grid 13 is connected through an impedance 16 whose function is to prevent parasitic oscillations to the plate 19 of a second electronic discharge tube or control tube 18 so that the control grids of the regulator tubes and the plate of the control tube are connected to the load line through the resistor 20. The control tube preferably is a pentode in order to obtain a high gain, although other tubes may be used. The resistor 20 is of about 3 megohms and in being connected to the input line 10 of the load circuit is also connected with the plates of the regulator tubes 11. A suitable potential may be applied to the screen grid 21 the connection shown being with the input of the load line through a resistor 22 of about 3 megohms. This resistor is connected in series with a voltage divider as will be described hereinafter. The cathode 23 is connected to ground of the control tube or a neutral line through a voltage stabilizing device such as a glow tube 24 which may be shunted by a suitable condenser 25.

A voltage divider or resistor is provided between the output line 15 and ground or the neutral line which includes a series of resistors 28, 29, and the parallel resistors 30 and 31 which are selectively connected by a range changing switch in series with a resistor 32 which may be a number of resistors. The control grid 33 of the control tube 18 is connected with the resistor at point 34 through a protecting resistor 35. The control grid is also connected with the output line 15 of the first unit through a condenser 36 of approximately .1 microfarad. This condenser provides means for impressing variations in the voltage of the output line 15 upon the control grid of the control tube 18. The screen grid 21 of the control tube 18 is connected with the voltage divider 32 at point 37. A resistor 38 is connected in series with the stabilizing means 24 which is connected with the positive end of the voltage divider 32.

A potential in the neighborhood of 1200 volts across the secondary of the transformer feeding the rectifier, results in a maximum output voltage of 300 volts or over in the output line 15. The first unit enables a regulated output voltage to be obtained roughly in the range from 200 to 300 volts. The selection of a voltage in this range is obtained when the range changing switch 40, which is made as a gang switch for simplicity in operation, is turned to the 200–300 volt range or to the uppermost position thereof in Figure 1. The output circuit for the first unit continues through wires 41 and 42, switch 40a, and wire 43 to the load or load terminal. In this position the switch 40b is also in its topmost position and introduces the rheostat 30 in series with the resistor 32 and adjustment of the rheostat enables a regulated output voltage to be selected in the range from 200 to 300 volts. A rheostat 44 forming a part of the resistor 32 may be provided to initially adjust the minimum voltage of the range. It will also be noted that in this upper range the switches 40a and 40c cut out the second unit from the circuit.

The second unit which is connected in cascade with the first unit enables the device to deliver voltages selected from zero up to 200 volts or more. This unit is connected with the output line 15 of the first unit through the wires 50 and 51 to a variable resistance means including one or more electronic discharge means or tubes 52 connected in parallel which provide the voltage regulator tubes of the second unit. The wire 51 is connected with the plates 53 of the tubes and the cathodes 54 are connected by wires 55, 56 and 83 to the output switch 40a which connects the second unit to line 43 and the load terminal. The load line for this second unit includes the wires 50 and 51, the regulator tubes of the second unit and the wires 55, 56, 83, the switch 40a, and the wire 43.

Each regulator tube 52 of the second unit has a control grid 60 which is connected to the plate 63 of a control tube 62 through suitable resistors 61 which prevent parasitic oscillation. Means are provided in this plate grid connection to supply the plate of the tube 62 with a positive potential and to supply the control grids 60 of the regulator tubes 52 with a suitable negative bias. This means for applying increased D. C. plate potential to the tube 62 and a negative bias to the control grid 60 of the regulator tubes 52 may be a battery or any other suitable means. The means particularly illustrated, however, includes a rectifier and filter, the D. C. output of which is applied across an impedance means or preferably a pair of resistors 64a and b, the positive terminal being connected to or adjacent the plate 63 of the control tube by a wire 66 and the negative terminal being connected by a wire 67 to the other end of the impedance means 64 that is so that its potential is applied to the control grid of the regulator tubes. The plate 63 of the control tube and the control grids of the regulator tubes are also connected with the load line or particularly with output of the first unit or the input of the second unit through a resistor 68 of about 2.5 megohms which is connected at a point between the ends of the resistor or impedance means 64. Although the connection of the resistor 68 is shown between the ends of the resistor 64, this connection may be made at any point therein or at its ends with substantially identical results. The introduction of these potentials is necessary at low output voltages in order to maintain an adequate potential upon the plate 63 of the control tube 62 and a proper negative bias upon the control grids 60 of the regulator tubes 52.

The source of potential applied across the wires 66 and 67 may be from an independent rectifier preferably of the full wave type and provided with a suitable filter. There may be the normal ripple from the filter in the voltage applied to the plate of the control tube 62 without affecting to any noticeable or material extent the regulation of the voltage from the output of the second unit.

The control tube 62 may be a pentode having a screen grid 72 connected with the output of the first unit or the plates of the regulator tubes 52 through a resistor 73 of about .2 megohms and wire 50. The control grid 74 of the control tube is connected through a protecting resistor 75 directly to the output line 55 of the second unit. Any voltage variation in the output of the second unit of the regulator is applied wholly and directly to the control grid with the result that the control tube is more efficient and therefore a larger control voltage is applied to the regulator tubes 52 permitting better regulation. The cathode 76 of the control tube 62 is connected by a wire 77 to a potentiometer 78 forming part of voltage divider or resistor 79 which may be a series of resistors connected between the output 15 of the first unit and the neutral connection or ground. A suitable resistor 80 of about 25,000 ohms is connected between the screen grid and cathode of control tube 62 so that the screen potential in respect to the cathode does not greatly change as the cathode connection with the potentiometer 78 is adjusted.

In order to obtain any desired potential between approximately 60 and 200 volts, the range changing switch which includes the switch elements 40a, b, c, d and e operating as a unit from a single control, is moved to middle position. In this position the voltage divider or resistor 32 is connected in circuit by the switch 40b which also inserts the resistor 29 in series with the resistor 32. The output of the second unit from the regulator tubes, is connected through the wires 55, 56, and 83, then through the switch 40a and wire 43 to the positive load terminal. In this mid position of the range changing switch, a bleeder circuit is provided from the output wire 56 through the wire 84 and switch 40c, wire 85 and resistor 86 to ground. It will be noted that in mid position of the range changing switch the switch elements 40d and 40e engage with blank or unconnected contacts.

In the third position of the range changing switch which is provided to give a range from 0 to 60 volts, all of the switching elements 40a, b, c, d and e are in the lowermost position as shown in the drawing. In this position the switching element 40a connects the output of the second regulator unit with the load terminal. The switching element 40b introduces the resistor 28 in series with the voltage divider 32 so that it constitutes a part thereof. The switching element 40c introduces another bleeder resistor 90, the other end of which is connected with a neutral wire or ground. The switching element 40d connects the point 91 of the voltage divider or resistor 79 with a neutral wire or ground thereby shorting out a lower portion of the resistor or that portion thereof between the lower end of the cathode potentiometer 78 and ground. The last switching element 40e is connected with point 92 of the resistor 79 and introduces a resistor of about 6000 ohms shunting the potentiometer 78.

The rheostat 30 and potentiometer 78 may be and are shown as ganged voltage control means and may be controlled from a single knob because one potentiometer is cut out or is ineffective when the other is cut in or effective as will now be described. Ganging these two controls simplifies the operation of the regulator throughout its whole range. When the range changing switch is connected in the range from 200 to 300 volts or the topmost position shown in Figure 1, the second unit is disconnected by the switch element 40a and consequently adjustment of the potentiometer 78 or the cathode connection of the second unit has no effect. In this same position of the range changing switch, the switch element 40b has connected the rheostat 30 into the resistor circuit so that it controls the voltage output within its range. In the two lowermost positions of the range changing switch the second unit is connected in cascade with the first unit by the switch element 40a. In these same two positions, the switch element 40b has cut out the rheostat 30 so that its adjustment has no effect on the circuit and it is the adjustment of the potentiometer 78 which controls the output voltage.

The screen grid 21 of the control tube 18 has a voltage applied thereto by a voltage divider including the resistor 22 and a portion of the voltage divider 32. A resistor 94 may be connected between the points $x$—$y$ and depending upon its value and the value of resistor 22, the regulated output voltage from the first unit may vary either upwardly or downwardly from the selected voltage upon a decrease of current in the output line. In other words a condition may exist where the load device is such a distance from the regulator that the resistance between the regulator and load is a factor and upon the load drawing more current, the voltage at the device is less than the selected value because of the resistive drop in the connection. Where this condition exists a voltage drop in the line to the load requires for good regulation at the load that the output voltage of the regulator should increase with load current above the selected value to compensate for the resistive drop in the connection. Selection of the resistors will enable the circuit to regulate the output voltage upwardly or downwardly upon an increase in load current, if desired.

Ordinarily the circuit of Figure 1 will operate satisfactorily down to zero volts. It may be, however, because of some slight defect in the regulator tubes 52, that the circuit cannot be adjusted to zero volts. In order to enable the circuit to deliver these very low voltages regardless of this behavior of the regulator tubes, means are provided to bleed additional current in the 0–60 volt range as shown in Figure 2. The means illustrated includes a electronic discharge tube 95, such as a triode, shunting the bleeder resistor 90 in the lower range of voltages which tube may be introduced into the circuit by a separate switch or the switch 40c which introduces the bleeder resistor 90 into the circuit. This triode has a voltage of about plus one volt applied to its grid so that at the voltages just above zero, the tube draws sufficient plate current to stabilize the regulator tubes. However, because of the tube characteristics, the plate current does not increase in proportion to the output voltage at the higher voltages in this lowest range.

The circuit of Figure 3 shows essentially the second unit of Figure 1 with the modifications necessary in order to enable this unit to regulate the output voltage as a separate circuit or regulator. The unit is inserted into a circuit carrying unregulated D. C. current such as that obtained from a rectifier and filter. An input line 100 feeds the unregulated D. C. current to a regulator tube 101 having a plate 102, control grid 103 and a cathode 104. An output line 105 is connected with the cathode 104 and connects the regulator with the load terminal. The load line includes the input line, the regulator tube and the output line. A resistor 106 is connected between the load line and the control grid of the regulator tube and in the circuit illustrated this resistor is connected with the input line 100.

A control tube 109 is connected in series with the resistor 106 and is preferably a pentode having a plate 110, a screen grid 111, a control grid 112 and a cathode 113. The cathode of the control tube is connected in stabilizing relation with a stabilizing means such as a neon tube 114. The stabilizing means may have a resistance 115 in series therewith connected with the load line in the event that the stabilizing means provided, requires current in addition to that supplied through the control tube. A voltage divider is connected across the load line and includes the resistors 116 and 117 in series between which is the connection with the screen grid 111.

The control grid 112 of the control tube is connected to the output of the regulator tube so as to impress thereupon any voltage variations occurring in this line. In the circuit illustrated the control grid is directly connected with the output line 105 through a protecting resistance 120 and a bleeder circuit connects the output line 105 with the neutral line through a resistor 121.

In order to provide operating voltages for the control tube 109, a source of D. C. voltage is provided which is an independent source so far as the D. C. potential applied to the regulator tube is concerned. In the circuit illustrated a battery 124 is shown with its positive terminal connected to the plate. In order to provide the control grid 103 of the regulator tube with a proper negative bias an independent source of negative potential is provided in the battery 125. The two batteries may be regarded if desired, as a single source of D. C. potential. It is clear that any other source of D. C. potential may be provided such as that shown in Figure 1.

A construction is shown in Figure 4 which may serve as a second unit of a double regulator circuit as illustrated in Figure 1. It may also be used independently as a voltage regulator circuit. It differs from the circuit of Figure 1 in that the source of independent D. C. voltage for the control tube and for the negative bias of the regulator tube is from a transformer, the primary winding of which serves as a choke or as a part of the filter from the rectifier providing the principal source of D. C. current. In other words the A. C. ripple from the rectifier is utilized to provide the D. C. voltage for the control tube.

In the circuit of Figure 4, a rectifier 130 of any suitable construction may be connected with the A. C. supply line and feed D. C. current to a filter. The filter includes the condensers 131 and 132 between which is a primary winding 133 of a transformer which serves as the choke of the filter. The secondary winding 134 is connected with a rectifier 135 of any suitable type, that illustrated being a full wave rectifier. A suitable filter means is connected in circuit with the second rectifier including the resistors 136, 137 and 138 and condensers 140 and 141 and the D. C. voltage is presented across a resistor 142 with the positive terminal connected to the plate 143 of the control tube 144. The negative terminal of this source of D. C. potential is connected to the control grid 145 of the regulator tube 146. This circuit illustrates also that the regulator tube need not be one or more triodes but may be one or more pentodes connected in parallel.

The cathode 147 of the control tube is not connected directly with a stabilizing device, but is connected with a potentiometer 148 which, however is connected in stabilizing relation with the stabilizing device 149. The resistor 128 serves to vary the bias on the control grid of the regulator tube 146 as the current through the control tube 144 varies because of changes in the output voltage. This resistor is connected with the negative side of the secondary source of D. C. potential. In other respects the circuit corresponds with the circuit of Figure 3 and the second unit of the circuit in Figure 1.

The output of the rectifier 130 has sufficient A. C. ripple which, when stepped up in voltage by the transformer, and rectified, furnishes sufficient D. C. potential for the control tube. In utilizing the ripple from the principal rectifier a filter choke is eliminated since the transformer takes the place of this part of the filter. Not only is a filter choke eliminated but the filtering problem for the secondary source of D. C. potential is simplified by this circuit since the ripple frequency from the principal rectifier is twice that of the 60 cycle supply line and the ripple frequency from the secondary rectifier is four times the supply frequency.

In order to stabilize the supplementary source of D. C. potential, it is desirable though not necessary to connect a high impedance 150 from the midpoint of the resistor 129 to the neutral wire in order to maintain this power supply at a fixed D. C. potential with respect to ground. A condenser 151 may be connected between the cathode of the rectifier 135 and the screen grid of the control tube 144 which maintains the screen grid and the power supply at the same A. C. potential.

The circuit illustrated in Figure 5, provides means to negative or compensate for the effect of variations in the voltage of the cathode heater of the control tube. For example, if the voltage in the heater of the control tube should increase, the heater temperature would increase causing a greater current to pass through the control tube. This greater current would increase the negative bias on the control grid of the regulator tube, thereby causing a change in the output voltage therefrom even though the output current has not changed. The reverse result occurs for a decrease in heater potential. In order to correct for such occurrences, a device or circuit is provided to compensate for variations in the heater voltage. Such compensation is particularly desirable where the output voltages are low.

The device for compensation for variations in heater voltage is shown in a regulator circuit, connected with a three phase supply line 152, for delivering high current at low voltages although the device is equally suitable for the other circuits illustrated. The three phase rectifier 153 is connected through a filter with the regulator tubes 154 of the voltage regulator circuit or device which function in the same manner as the regulator tubes described in the other circuits and are controlled by a control tube 159.

The heater compensating means includes a pair of triodes 155—156, shown in a single envelope, connected in series. A biasing resistor 157 is connected between the tubes for providing a negative bias for the control grid 158 of triode 156. The control grid 160 of the control tube 159 is connected to the plate of the first triode 155 and the resistor 157 through a protective resistor 163. The cathode 161 of the first triode 155 is directly connected with the output line 162 of the load line. The plate 164 of the second triode 156 is connected by wire 165 with the positive side of a stabilized source of D. C. potential such as the neon tube 149. The control grid 166 of the first triode 155 may be connected with a potentiometer 167. The heaters of both triodes and the control tube are connected with the same source of heater potential.

A supplementary or secondary source of D. C. potential is connected with the control tube 159 in the same manner as described in connection with the circuit of Figure 1 and need not be further described.

The heater compensating means operates in a manner now to be described. If the heater voltage increases, an increased current will flow through the first triode 155 and also through the second triode 156, the latter acting as a plate load impedance for the former. This increase in heater voltage and temperature of triode 156 causes the internal impedance between plate 164 and cathode of tube 156 to decrease. A suitable resistor 157 biases the control grid 158 of triode 156 so that the decrease of its plate impedance together with the increase in plate current of triode 155 produce only a small change in the potential drop between wire 165 and the plate of triode 155. This small change is applied to the control grid 160 of control tube 159 to reduce the plate current of this tube sufficiently to counterbalance the tendency for the plate current to rise when the heater voltage of control tube 159 increases. Thus the plate current of tube 159 is rendered insensitive to heater voltage variation and the output voltage is therefore insensitive to heater voltage variation. The heater compensating means and the control tube herein described function as an amplifier and may be used in any D. C. amplifier circuit.

This invention is presented to fill a need for improvements in a regular circuit. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A control circuit for insertion in a load circuit carrying unregulated D. C. current comprising at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, control grid and cathode, stabilizing means connected across the load circuit including an impedance and a voltage stabilizing device connected in series, means connecting the cathode of the second electronic discharge means in stabilizing relation with the stabilizing means, means impressing on the control grid of the second electronic discharge means a voltage which varies in accordance with the output voltage of the first electronic discharge means, and a secondary source of D. C. potential having a positive and negative terminal with the positive terminal connected with the plate of the second electronic discharge means and the negative terminal connected with the grid of the first electronic discharge means.

2. A control circuit for insertion in a load circuit carrying unregulated D. C. current comprising at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, control grid and cathode, a voltage stabilizing device connected in series with the second electronic discharge device, means impressing on the control grid of the second electronic discharge means a voltage which varies in accordance with the output voltage of the first electronic discharge means, and a secondary source of D. C. potential having a positive and a negative terminal with the former connected with the plate of the second discharge means and the negative terminal being connected with the grid of the first electronic discharge means.

3. A control circuit for insertion in a load circuit carrying unregulated D. C. current comprising at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, control grid and cathode, an impedance connected between the plate of the second discharge means and the control grid of the first electronic discharge means, a voltage stabilizing device connected in stabilizing relation with the second electronic discharge device, means impressing on the control grid of the second electronic discharge means a voltage which varies in accordance with the output voltage of the load circuit, and a secondary source of D. C. potential connected across the next aforesaid impedance with the positive terminal connected at the end thereof adjacent the plate of the second electronic discharge means and the negative terminal being connected with the end adjacent the grid of the first electronic discharge means.

4. A control circuit for insertion in a load circuit carrying unregulated D. C. current comprising at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, control grid, screen grid and cathode, a voltage stabilizing device connected in stabilizing relation with the second electronic discharge device, means impressing a voltage on the screen grid, means impressing on the control grid of the second electronic discharge means a voltage which varies in accordance with the voltage of the load circuit, a secondary source of positive potential connected in additive series with the load circuit and applied to the plate of the second electronic discharge means, and a source of negative potential applied to the grid of the first electronic discharge means.

5. A control circuit for insertion in a load circuit carrying unregulated D. C. current comprising at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, grid, screen grid and cathode, a voltage stabilizing means connected with the load circuit and connected in stabilizing relation with the second electronic discharge device including a stabilizing device and an impedance connected in series with the stabilizing device, means impressing a voltage on the screen grid, means impressing on the control grid of the second electronic discharge means a voltage which varies in accordance with the voltage of the load circuit, a secondary source of positive potential connected in additive series with the load circuit and applied to the plate of the second electronic discharge means and a source of negative potential applied to the grid of the first electronic discharge device.

6. A control circuit for insertion in a load circuit carrying unregulated D. C. current comprising variable resistance electronic discharge means adapted to be connected in series in and form part of the load circuit and having a plate, control grid and cathode, an impedance element connected between the control grid and the load circuit, a second electronic discharge means connected in series with the impedance and having a plate, grid, screen grid and cathode, a voltage stabilizing device connected in stabilizing relation with the cathode of second electronic discharge device, means impressing a voltage on the screen grid, a direct connection between the control grid of the second electronic discharge means and the point of highest potential on the output side of the load circuit to apply thereto a voltage which varies in accordance with the voltage of the load circuit, and a secondary source of potential having positive and negative terminals with the positive terminal connected with the plate of the second electronic discharge device and the negative terminal connected with the control grid of the first electronic discharge device.

7. A control circuit for insertion in a load circuit carrying D. C. current comprising variable resistance means including at least one electronic discharge means adapted to be connected in series in and form part of the load circuit and having a plate, control grid and cathode, an impedance element connected between the control grid and the load circuit, a second electronic discharge means connected in series with the impedance and having a plate, control grid and cathode, means impressing on the control grid of the second electronic discharge means a voltage which varies in accordance with the output voltage of the load circuit, and a secondary source of D. C. potential having a positive and negative terminal with the positive terminal connected with the plate of the second electronic discharge device and the negative terminal connected with the control grid of the first electronic discharge device.

8. A control circuit for insertion in a load circuit carrying D. C. current comprising variable resistance electronic discharge means adapted to be connected in series in and form part of the load circuit and having a plate, control grid and cathode, an impedance element connected between the control grid and the load circuit, a second electronic discharge means connected in series with the impedance and having a plate, control grid and cathode, an impedance connected between the load circuit and the cathode, means impressing on the control grid of the second electronic discharge means a voltage which varies in accordance with the output voltage of the load circuit, a secondary source of D. C. potential having a positive and negative terminal with the positive terminal connected with the plate of the second electronic discharge device and the negative terminal connected with the control grid of the first electronic discharge device, and means to adjust the cathode voltage.

9. A control circuit for insertion in a load circuit carrying D. C. current comprising variable resistance electronic discharge means adapted to be connected in series in and form part of the load circuit and having a plate, control grid and cathode, an impedance connected between the control grid and the load circuit, a second electronic discharge means connected in series with the impedance and having a plate, control grid, screen grid and cathode, an impedance connected between the load circuit and the cathode of the second discharge means, means connecting the screen grid to the next aforesaid impedance to impress a voltage on the screen grid, means impressing on the control grid of the second electronic discharge means a voltage which varies in accordance with the output voltage of the load circuit, a secondary source of D. C. potential having a positive and negative terminal with the positive terminal connected with the plate of the second electronic discharge means and the negative terminal connected with the grid of the first electronic discharge device, an impedance connected across the load circuit including a potentiometer, and a connection between the cathode of the second electronic discharge means and the potentiometer.

10. A control circuit for insertion in a load circuit carrying D. C. current comprising variable resistance means adapted to be connected in series in and form part of the load circuit including at least one electronic discharge device each having a plate, control grid and cathode, a second electronic discharge device having a plate, control grid, screen grid and cathode connected with ground, an impedance connected between the plate of the second electronic discharge device and each control grid of the variable resistance means, a secondary source of D. C. potential applied across the aforesaid impedance with the positive terminal connected to the plate of the second electronic discharge device, an impedance connected between the load circuit and the aforesaid impedance, an impedance connected between the load circuit and the cathode of the second electronic discharge device, means connecting the screen grid to the next aforesaid impedance to impress a voltage on the screen grid, and means impressing on the control grid of the second electronic discharge means a voltage which varies in accordance with the output voltage of the load circuit.

11. A control circuit for insertion in a load circuit carrying D. C. current comprising variable resistance means adapted to be connected in series in and form part of the load circuit including at least one electronic discharge device each having a plate, control grid and cathode, a second electronic discharge device having a plate, control grid, screen grid and cathode connected with ground, a pair of impedances connected between the plate of the second electronic discharge device and the control grid of each electronic discharge device of the variable resistance means, a secondary source of D. C. potential applied across the aforesaid pair of impedances with the positive terminal connected to the plate of the second electronic discharge means, an impedance connected between the load circuit and a point between the aforesaid pair of impedances, an impedance connected between the load circuit and the cathode of the second electronic discharge device, means connecting the screen grid to the next aforesaid impedance to impress a voltage on the screen grid, and means impressing on the control grid of the second electronic discharge means a voltage which varies in accordance with the voltage of the load circuit.

12. A control circuit for insertion in a load circuit carrying D. C. current comprising variable resistance means including at least one electronic discharge means adapted to be connected in series in and form part of the load circuit and each having a plate, control grid and cathode, a resistor connected between the load circuit and the grids of the electronic discharge means, a second electronic discharge means connected in series with the aforesaid resistor and having a plate, control grid, and cathode connected in series with the aforesaid resistor and connected with ground, a secondary source of D. C. potential with the positive terminal connected to the plate of the second electronic discharge means and the negative terminal connected with the control grid of the first electronic discharge means, an impedance connected between the load circuit and the cathode of the second electronic discharge means, and means impressing on the control grid of the second electronic discharge means a voltage which varies in accordance with the output voltage of the load circuit.

13. A control circuit for insertion in a load circuit carrying D. C. current comprising variable resistance means adapted to be connected in series in and form part of the load circuit including at least one electronic discharge means having a plate, control grid and cathode, a second electronic discharge means having a plate, control grid and cathode connected with ground, a pair of impedances connected between the plate of the second electronic discharge means and the control grid of the first electronic discharge means, a secondary source of D. C. potential applied across the aforesaid pair of impedances with the positive terminal connected to the plate of the second electronic discharge means, an impedance connected between the load circuit and a point between the aforesaid pair of impedances, an impedance connected between the load circuit and the cathode of the second electronic discharge means, and means impressing on the control grid of the second electronic discharge means a voltage which varies in accordance with the voltage of the load circuit.

14. A control circuit for insertion in a load circuit carrying D. C. current comprising variable resistance means adapted to be connected in series in and form part of the load circuit including one or more electronic discharge means each having a plate, control grid and cathode, a second electronic discharge means having a plate, control grid, screen grid and cathode, a potentiometer connecting the cathode with ground, a secondary source of D. C. current with the positive terminal connected to the plate of the second electronic discharge means and the negative terminal connected with the control grid of the variable resistance electronic discharge means, an impedance connected between the load circuit and a point between the aforesaid positive and negative terminals, an impedance connected between the load circuit and the cathode of the second electronic discharge means, means connecting the screen grid to the next aforesaid impedance to impress a voltage on the screen grid which is tied to the cathode, means impressing on the control grid of the second electronic discharge means a voltage which varies in accordance with the voltage of the load circuit.

15. A control circuit for insertion in a load circuit carrying unregulated D. C. current comprising at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, control grid and cathode, stabilizing means connected across the load circuit including an impedance and a voltage stabilizing device connected in series with a portion thereof and in shunt with a portion, means connecting the cathode of the second electronic discharge means with the shunted portion of the next aforesaid impedance means, means impressing on the control grid of second electronic discharge means a voltage which varies in accordance with the output voltage of the first electronic discharge means, and a secondary source of D. C. potential having a positive and negative terminal with the positive terminal connected with the plate of the second electronic discharge means and the negative terminal connected with the grid of the first electronic discharge means.

16. A control circuit for insertion in a load circuit carrying unregulated D. C. current comprising at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, control grid and cathode, stabilizing means connected across the load circuit including an impedance and a voltage stabilizing device connected in series with a portion thereof and in shunt with a portion, means connecting the cathode of the second electronic discharge means with the shunted portion of the next aforesaid impedance means, means impressing on the control grid of the second electronic discharge means a voltage which varies in accordance with the output voltage of the first electronic discharge means, an impedance connected between the plate of the second discharge means and the control grid of the first discharge means, and a source of D. C. potential connected across the next aforesaid impedance having a positive and negative terminal and with the positive terminal connected with the plate of the second electronic discharge means and the negative terminal connected with the control grid of the first electronic discharge means.

17. A control circuit for insertion in a load circuit comprising a rectifier, a filter connected therewith including the primary winding of a transformer, at least one variable resistance electronic discharge means connected in series with the filter and forming part of the load circuit and each having a plate, control grid and cathode, an impedance element connected between the control grid and the load circuit, a second electronic discharge means connected in series with the impedance and having a plate, control grid and cathode, stabilizing means connected across the load circuit including an impedance and a voltage stabilizing device connected in series, means connecting the cathode of the second electronic discharge means in stabilizing relation with the stabilizing means, means impressing on the control grid of the second electronic discharge means a voltage which varies in accordance with the output voltage of the first electronic discharge means, and a second rectifier connected with the secondary of the transformer to provide a source of D. C. potential and having a positive and negative terminal with the positive terminal connected with the plate of the second electronic discharge means and the negative terminal connected with the grid of the first electronic discharge means.

18. A control circuit for insertion in a load circuit carrying unregulated D. C. current comprising a rectifier, a filter connected therewith including the primary winding of a transformer, at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, control grid and cathode, stabilizing means connected across the load circuit including an impedance and a voltage stabilizing device connected in series, means connecting the cathode of the second electronic discharge means in stabilizing relation with the stabilizing means, means impressing on the control grid of the second electronic discharge means a voltage which varies in accordance with the output voltage of the first electronic discharge means, an impedance connected between the plate of the second electronic discharge means and the control grid of the first electronic discharge means, and a second rectifier connected with the secondary of the transformer to provide a source of D. C. potential connected across the next aforesaid impedance and having a positive and negative terminal with the positive terminal connected with the plate of the second electronic discharge means and the negative terminal connected with the grid of the first electronic discharge means.

19. A control circuit for insertion in a load line carrying unregulated D. C. current comprising at least one variable resistance electronic discharge means adapted to be connected in series in and form part of the load line and each having a plate, control grid and cathode, an impedance element connected between the control grid and the load line, a second electronic discharge means connected in series with the impedance element and having a plate, screen grid, control grid and cathode, stabilizing means connected across the load line including an impedance and a voltage stabilizing device connected in series, means connecting the cathode of the second electronic discharge means in stabilizing relation with the stabilizing means, means impressing on the control grid of the second electronic discharge means a voltage which varies in accordance with the output voltage of the first electronic discharge means, resistive means connecting the screen grid with the input and output of the first electronic discharge means and with ground, the impedance between the screen grid connection and ground being selected to regulate the output voltage above or below the selected output voltage upon a variation in load current occurring.

20. A control circuit for insertion in a load line carrying unregulated D. C. current comprising at least one variable resistance electronic discharge means adapted to be connected in series in and form part of the load line and each having a plate, control grid and cathode, an impedance element connected between the control grid and the load line, a second electronic discharge means connected in series with the impedance and having a plate, screen grid, control grid and cathode, stabilizing means connected across the load line including an impedance and a voltage stabilizing device connected in series, means connecting the cathode of the second electronic discharge means in stabilizing relation with the stabilizing means, means impressing on the control grid of the second electronic discharge means a voltage which varies in accordance with the output voltage of the first electronic discharge means, a voltage divider connected between the output of the first electronic discharge means and ground, an impedance connected between the screen grid and the plate of first electronic discharge means, and a connection between the screen grid and the voltage divider.

21. A control circuit for insertion in a load line carrying unregulated D. C. current comprising at least one variable resistance electronic discharge means adapted to be connected in series in and form part of the load line and each having a plate, control grid and cathode, an impedance element connected between the control grid and the load line, a second electronic discharge means connected in series with the impedance and having a plate, screen grid, control grid and cathode, stabilizing means connected across the load line including an impedance and a voltage stabilizing device connected in series, means connecting the cathode of the second electronic discharge means in stabilizing relation with the stabilizing means, means impressing on the control grid of the second electronic discharge means a voltage which varies in accordance with the output voltage of the first electronic discharge means, a voltage divider connected between the output of the first electronic discharge means and ground, a resistor connected between the screen grid and the plate of the first electronic discharge means, and a connection from the screen grid to the voltage divider including an impedance selected to regulate the output voltage above or below the selected output voltage upon a variation in load current occurring.

22. A control circuit for insertion in a load line carrying unregulated D. C. current comprising at least one variable resistance electronic discharge means adapted to be connected in series in and form part of the load line and each having a plate, control grid and cathode, an impedance element connected between the control grid and the load line, a second electronic discharge means connected in series with the impedance and having a plate, screen grid, control grid and cathode, stabilizing means connected across the load line including an impedance and a voltage stabilizing device connected in series, means connecting the cathode of the second electronic discharge means in stabilizing relation with the stabilizing means, means impressing on the control grid of the second electronic discharge means a voltage which varies in accordance with the output voltage of the first electronic discharge means and compensating for variations in the heater of the control tube including a pair of electronic discharge means connected in series each having a plate, control grid and a cathode, a connection between the output of the regulator tube and the cathode of the first of the pair of electronic discharge means, a connection between the plate of the first of the electron discharge tubes and the control grid of the control tube, and a connection to apply potential to the second of the pair of electron discharge tubes.

23. A control circuit for insertion in a load circuit carrying D. C. current comprising variable resistance means adapted to be connected in series in and form part of the load circuit including one or more electronic discharge means each having a plate, control grid and cathode, a second electronic discharge means having a plate, control grid and cathode connected with ground, a secondary source of D. C. current with the positive terminal connected to the plate of the second electronic discharge means and the negative terminal connected with the control grid of the first electronic discharge means including a rectifier, means to stabilize the operation of the rectifier with respect to the control tube, an impedance connected between the load circuit and the control grid of the first electronic discharge means and in series with the second electronic discharge means, and means impressing on the control grid of the second electronic discharge means a voltage which varies in accordance with the voltage of the load circuit.

24. A control circuit for insertion in a load circuit carrying D. C. current comprising variable resistance means adapted to be connected in series in and form part of the load circuit including one or more electronic discharge means each having a plate, control grid and cathode, a second electronic discharge means having a plate, control grid and cathode connected with ground, a secondary source of D. C. current with the positive terminal connected to the plate of the second electronic discharge means and the negative terminal connected with the control grid of the first electronic discharge means, including a rectifier having a positive and a negative lead, means to stabilize the secondary source of D. C. current including a high resistance connected between the negative lead and ground, an impedance connected between the load circuit and the control grid of the first electronic discharge means and in series with the second electronic discharge means, and means impressing on the control grid of the second electronic discharge means a voltage which varies in accordance with the voltage of the load circuit.

25. A control circuit for insertion in a load circuit carrying D. C. current comprising variable resistance means adapted to be connected in series in and form part of the load circuit including one or more electronic discharge means each having a plate, control grid and cathode, a second electronic discharge means having a plate, control grid, screen grid and cathode connected with ground, a secondary source of D. C. current with the positive terminal connected to the plate of the second electronic discharge means and the negative terminal connected with the control grid of the first electronic discharge means, including a rectifier having a positive and a negative lead, a condenser connected between the positive lead and the screen grid of the second electronic discharge means, a high resistance connected between the negative lead and ground, an impedance connected between the load circuit and the control grid of the first electronic discharge means and in series with the second electronic discharge means, an impedance connected between the load circuit and the cathode of the second electronic discharge means, means connecting the screen grid to the next aforesaid impedance to impress a voltage on the screen grid, and means impressing on the control grid of the second electronic discharge means a voltage which varies in accordance with the voltage of the load circuit.

26. A control circuit for insertion in a load circuit carrying unregulated D. C. current comprising a first unit including at least one variable resistance electronic discharge means adapted to be connected in series in and form part of the load circuit and each having a plate, control grid and cathode, an impedance connected between the control grid and the load circuit, a second electronic discharge means connected in series with the impedance and having a plate, control grid and cathode, stabilizing means connected across the load circuit including an impedance and a voltage stabilizing device connected in series, means connecting the cathode of the second electronic discharge means in stabilizing relation with the voltage stabilizing device, and means impressing on the control grid of the second electronic discharge means a voltage which varies in accordance with the output voltage of the first electronic discharge means; a second unit including at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, control grid and cathode, means impressing on the control grid of the second electronic discharge means a voltage which varies in accordance with the output voltage of the first electronic discharge means, and a secondary source of D. C. potential having a positive and negative terminal with the positive terminal connected with the plate of the second electronic discharge means and the negative terminal connected with the grid of the first electronic discharge means.

27. A control circuit for insertion in a load circuit carrying unregulated D. C. current comprising a first unit including at least one variable resistance electronic discharge means adapted to be connected in series in and form part of the load circuit and each having a plate, control grid and cathode, an impedance connected between the control grid and the load circuit, a second electronic discharge means connected in series with the impedance and having a plate, control grid and cathode, stabilizing means connected across the load circuit including an impedance and a voltage stabilizing device connected in series, means connecting the cathode of the second electronic discharge means in stabilizing relation with the voltage stabilizing device, and means impressing on the control grid of the second electronic discharge means a voltage which varies in accordance with the output voltage of the first electronic discharge means; and a second unit including at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, control grid and cathode, a voltage divider including a potentiometer, means connecting the cathode of the second electronic discharge means with the potentiometer, means impressing on the control grid of the second electronic discharge means a voltage which varies in accordance with the output voltage of the first electronic discharge means, and a secondary source of D. C. potential having a positive and negative terminal with the positive terminal connected with the plate of the second electronic discharge means and the negative terminal connected with the grid of the first electronic discharge means.

28. A control circuit for insertion in a load circuit carrying unregulated D. C. current comprising a first unit including at least one variable resistance electronic discharge means adapted to be connected in series in and form part of the load circuit and each having a plate, control grid and cathode, an impedance connected between the control grid and the load circuit, a second electronic discharge means connected in series with the impedance and having a plate, control grid and cathode, stabilizing means connected across the load circuit including an impedance and a voltage stabilizing device connected in series, means connecting the cathode of the second electronic discharge means in stabilizing relation with the voltage stabilizing device, and means impressing on the control grid of the second electronic discharge means a voltage which varies in accordance with the output voltage of the first electronic discharge means; a second unit including at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, control grid and cathode, means impressing on the control grid of the second electronic discharge means a voltage which varies in accordance with the output voltage of the first electronic discharge means, and a secondary source of D. C. potential having a positive and negative terminal with the positive terminal connected with the plate of the second electronic discharge means and the negative terminal connected with the grid of the first electronic discharge means; and switching means for connecting and disconnecting the second unit from the circuit.

29. A control circuit for insertion in a load circuit carrying unregulated D. C. current at higher voltages comprising a first unit including at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, control grid and cathode, stabilizing means connected across the load circuit including an impedance and a voltage stabilizing device connected in series, means connecting the cathode of the second electronic discharge means in stabilizing relation with the voltage stabilizing device, and means impressing on the control grid of the second electronic discharge means a voltage which varies in accordance with the output voltage of the first electronic discharge means; a second unit including at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, control grid and cathode, means impressing on the control grid of the second electronic discharge means a voltage which varies in accordance with the output voltage of the first electronic discharge means, and a secondary source of D. C. potential having a positive and negative terminal with the positive terminal connected with the plate of the second electronic discharge means and the negative terminal connected with the grid of the first electronic discharge means; a bleeder circuit connected across the output of the first unit including a potentiometer; and switching means to connect and disconnect the second unit from the circuit and to connect the potentiometer into the bleeder circuit when the second unit is disconnected from the circuit.

30. A control circuit for insertion in a load circuit carrying unregulated D. C. current and providing a regulated output voltage which is adjustable from zero volts to about two hundred volts comprising a first unit including at least one variable resistance electronic discharge means adapted to be connected in series in and form part of the load circuit and each having a plate, control grid and cathode, an impedance connected between the control grid and the load circuit, a second electronic discharge means connected in series with the impedance and having a plate, control grid and cathode, stabilizing means connected across the load circuit including an impedance and a voltage stabilizing device connected in series, means connecting the cathode of the second electronic discharge means in stabilizing relation with the voltage stabilizing device, and means impressing on the control grid of the second electronic discharge means a voltage which varies in accordance with the output voltage of the first electronic discharge means; a second unit including at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, control grid and cathode, an impedance connected across the input of the second unit including a potentiometer, means connecting the cathode of the second electronic discharge means with the potentiometer, means impressing on the control grid of the second electronic discharge means a voltage which varies in accordance with the output voltage of the first electronic discharge means, and a secondary source of D. C. potential having a positive and negative terminal with the positive terminal connected with the plate of the second electronic discharge means and the negative terminal connected with the grid of the first electronic discharge means; and switching means to connect and disconnect the second unit from the circuit.

31. A control circuit for insertion in a load circuit carrying unregulated D. C. current and providing a regulated output voltage which is adjustable from zero volts up to hundreds of volts comprising a first unit including at least one variable resistance electronic discharge means adapted to be connected in series in and form part of the load circuit and each having a plate, control grid and cathode, an impedance connected between the control grid and the load circuit, a second electronic discharge means connected in series with the impedance and having a plate, control grid and cathode, stabilizing means connected across the load circuit including an impedance and a voltage stabilizing device connected in series, means connecting the cathode of the second electronic discharge means in stabilizing relation with the voltage stabilizing device, means impressing on the control grid of the second electronic discharge means a voltage which varies in accordance with the output voltage of the first electronic discharge means and a voltage divider connected across the output of the first unit and including a potentiometer; a second unit including at least one variable resistance electronic discharge means connected in series in and forming part of the load circuit and each having a plate, control grid and cathode, an impedance element connected between the control grid and the load circuit, a second electronic discharge means connected in series with the impedance and having a plate, control grid and cathode, an impedance connected across the input of the second unit including a potentiometer, means connecting the cathode of the second electronic discharge means with the potentiometer, means impressing on the control grid of the second electronic discharge means a voltage which varies in accordance with the output voltage of the first electronic discharge means of the second unit, and a secondary source of D. C. potential having a positive and negative terminal with the positive terminal connected with the plate of the second electronic discharge means and the negative terminal connected with the grid of the first electronic discharge means; and switching means for connecting and disconnecting the second unit into and out of the circuit and for connecting into the circuit the potentiometer for the first unit when the second unit is disconnected.

32. A control circuit for insertion in a load circuit carrying unregulated D. C. current and providing a regulated output voltage which is adjustable from zero volts up to hundreds of volts comprising a first unit including at least one variable resistance electronic discharge means adapted to be connected in series in and form part of the load circuit and each having a plate, control grid and cathode, an impedance element connected between the control grid and the load circuit, a second electronic discharge means connected in series with the impedance and having a plate, control grid and cathode, stabilizing means connected across the load circuit including an impedance and a voltage stabilizing device connected in series, means connecting the cathode of the second electronic discharge means in stabilizing relation with the voltage stabilizing device, means impressing on the control grid of the second electronic discharge means a voltage which varies in accordance with the output voltage of the first electronic discharge means and a voltage divider connected across the output of the first unit and including a potentiometer; a second unit including at least one variable resistance electronic discharge means connected in series in and forming part of the load circuit and each having a plate, control grid and cathode, a second electronic discharge means connected in series with the impedance and having a plate, control grid and cathode, a plate to grid impedance connected between the plate of the next aforesaid discharge means and the control grid of the first discharge tube of the second unit, an impedance connected at a point between the ends of the next aforesaid impedance and the load circuit, an impedance connected across the input of the second unit including a potentiometer, means connecting the cathode of the second electronic discharge means with the potentiometer, means impressing on the control grid of the second electronic discharge means a voltage which varies in accordance with the output voltage of the first electronic discharge means of the second unit, and a secondary source of D. C. potential connected across the plate to grid impedance and having a positive and negative terminal with the positive terminal connected adjacent to the plate of the second electronic discharge means and the negative terminal connected adjacent to the grid of the first electronic discharge means; and switching means for connecting and disconnecting the second unit into and out of the circuit.

33. A control circuit for insertion in a load circuit carrying unregulated D. C. current and providing a regulated output voltage which is adjustable from zero volts up to hundreds of volts comprising a first unit including at least one variable resistance electronic discharge means adapted to be connected in series in and form part of the load circuit and each having a plate, control grid and cathode, an impedance connected between the control grid and the load circuit, a second electronic discharge means connected in series with the impedance and having a plate, control grid and cathode, stabilizing means connected across the load circuit including an impedance and a voltage stabilizing device connected in series, means connecting the cathode of the second electronic discharge means in stabilizing relation with the voltage stabilizing device, means impressing on the control grid of the second electronic discharge means a voltage which varies in accordance with the output voltage of the first electronic discharge means and a voltage divider connected across the output of the first unit and including a potentiometer; a second unit including at least one variable resistance electronic discharge means connected in series in and forming part of the load circuit and each having a plate, control grid and cathode, an impedance element connected between the control grid and the load circuit, a second electronic discharge means connected in series with the impedance and having a plate, control grid and cathode, an impedance connected across the input of the second unit including a potentiometer, means connecting the cathode of the second electronic discharge means with the potentiometer, means impressing on the control grid of the second electronic discharge means a voltage which varies in accordance with the output voltage of the first electronic discharge means, and a secondary source of D. C. potential having a positive and negative terminal with the positive terminal connected with the plate of the second electronic discharge means and the negative terminal connected with the grid of the first electronic discharge means; switching means for connecting and disconnecting the second unit into and out of the circuit and for connecting into the circuit the potentiometer for the first unit when the second unit is disconnected; and a single control for the potentiometers of both units.

34. A control circuit for insertion in a load circuit carrying D. C. current comprising variable resistance means adapted to be connected in series in and form part of the load circuit including one or more regulator electronic discharge tubes each having a plate, control grid and cathode, a control electronic discharge tube having a plate, control grid and cathode connected with ground, a secondary source of D. C. current with the positive terminal connected to the plate of the control tube and the negative terminal connected with the control grid of each regulator tube, an impedance connected between the load circuit and the control grids of the regulator tubes and in series with the control tube, and means impressing on the control grid of the control tube a voltage which varies in accordance with the voltage of the load circuit, and compensation for variations in heater voltage including a pair of electronic discharge tubes connected in series and each having a plate, control grid and cathode, a resistance between the pair of tubes, a connection between the grid of the second and the plate of the first of the pair of tubes, a common source of current for the cathode heaters of the pair of tubes and the control tube, a connection between the output line and the cathode of the first of the pair of tubes, a connection between the plate of the first of the pair of tubes and the control grid of the control tube, and a connection between the load circuit and the plate of the second of the pair of tubes.

LIONEL P. PARADISE.
WERNER F. AUERBACHER.